US012145249B2

(12) United States Patent
Kawakami et al.

(10) Patent No.: US 12,145,249 B2
(45) Date of Patent: Nov. 19, 2024

(54) POWER TOOL

(71) Applicant: MAKITA CORPORATION, Anjo (JP)

(72) Inventors: Takahiro Kawakami, Anjo (JP); Yu Eto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/987,998

(22) Filed: Nov. 16, 2022

(65) Prior Publication Data

US 2023/0191583 A1 Jun. 22, 2023

(51) Int. Cl.
*B25F 5/00* (2006.01)
*B25F 5/02* (2006.01)

(52) U.S. Cl.
CPC .............. *B25F 5/006* (2013.01); *B25F 5/026* (2013.01)

(58) Field of Classification Search
CPC ................................. B25F 5/006; B25F 5/026
See application file for complete search history.

(56) References Cited

U.S. PATENT DOCUMENTS 5,888,031 A * 3/1999 Buck ...................... B25F 5/026 408/110
6,716,095 B1 * 4/2004 Hsu ......................... B24B 23/02 451/259
2005/0087353 A1 * 4/2005 Oki ......................... B25F 5/006 173/162.2
2009/0188691 A1 * 7/2009 Hahn .................. B25D 17/043 173/162.2
2010/0206595 A1 * 8/2010 Kamegai ................ B25F 5/006 173/162.2
2011/0011609 A1 * 1/2011 Simm ..................... B25F 5/026 173/171
2011/0120741 A1 * 5/2011 Limberg ................. B25G 1/10 16/421
2012/0211250 A1 * 8/2012 Yamauchi ............... B25F 5/026 173/162.2
2018/0193996 A1 * 7/2018 Hirano ..................... B25G 1/06
2020/0384597 A1 * 12/2020 Numata .................. B25F 5/026
2020/0384627 A1 * 12/2020 Numata ................ B24B 23/005
2023/0061232 A1 * 3/2023 Eto ......................... B25F 5/026
2023/0064399 A1 * 3/2023 Otani ...................... B25F 5/026

FOREIGN PATENT DOCUMENTS

JP 4920900 B2 4/2012
WO WO-2020241086 A1 * 12/2020

* cited by examiner

*Primary Examiner* — Thomas M Wittenschlaeger
*Assistant Examiner* — Katie L Gerth
(74) *Attorney, Agent, or Firm* — Oliff PLC

(57) ABSTRACT

A power tool effectively isolates vibration with an auxiliary handle having no structure for isolating vibration. A power tool to which an auxiliary handle is attachable includes a housing, a nut held on a side surface of the housing to be screwed with the auxiliary handle, and an elastic member between the housing and the nut.

9 Claims, 16 Drawing Sheets

POWER TOOL

CROSS-REFERENCE TO RELATED APPLICATIONS

This application claims the benefit of priority to Japanese Patent Application No. 2021-205411, filed on Dec. 17, 2021, the entire contents of which are hereby incorporated by reference.

BACKGROUND

1. Technical Field

The present disclosure relates to a power tool such as a polisher or a grinder.

2. Description of the Background

A power tool such as a polisher or a grinder includes an auxiliary handle (e.g., a side handle) grippable by an operator. The auxiliary handle is attached to a housing for a tool body. Thus, vibration from the tool body is transmitted to a hand of the operator through the auxiliary handle. This degrades the operability of the auxiliary handle.

In response to this, for example, Japanese Patent No. 4920900 (hereafter, Patent Literature 1) describes a vibration isolating handle including a clampband to clamp a tool body, a threaded rod to generate a clamping force in the clampband, and a grip accommodating the threaded rod. The vibration isolating handle includes a rubber cushion between the threaded rod and the grip, and a dynamic vibration absorber in the grip.

BRIEF SUMMARY

A known power tool with a vibration isolating handle as described in Patent Literature 1 can isolate vibration, whereas a known power tool without any vibration isolating handle does not isolate vibration.

One or more aspects of the present disclosure are directed to a power tool that effectively isolates vibration with an auxiliary handle having no structure for isolating vibration.

A first aspect of the present disclosure provides a power tool to which an auxiliary handle is attachable, the power tool including:

a housing;

a nut held on a side surface of the housing to be screwed with the auxiliary handle; and an elastic member between the housing and the nut.

The power tool according to the above aspect of the present disclosure effectively isolates vibration with the auxiliary handle having no structure for isolating vibration.

DETAILED DESCRIPTION

First Embodiment

Embodiments of the present disclosure will now be described with reference to the drawings.

Figure 1:
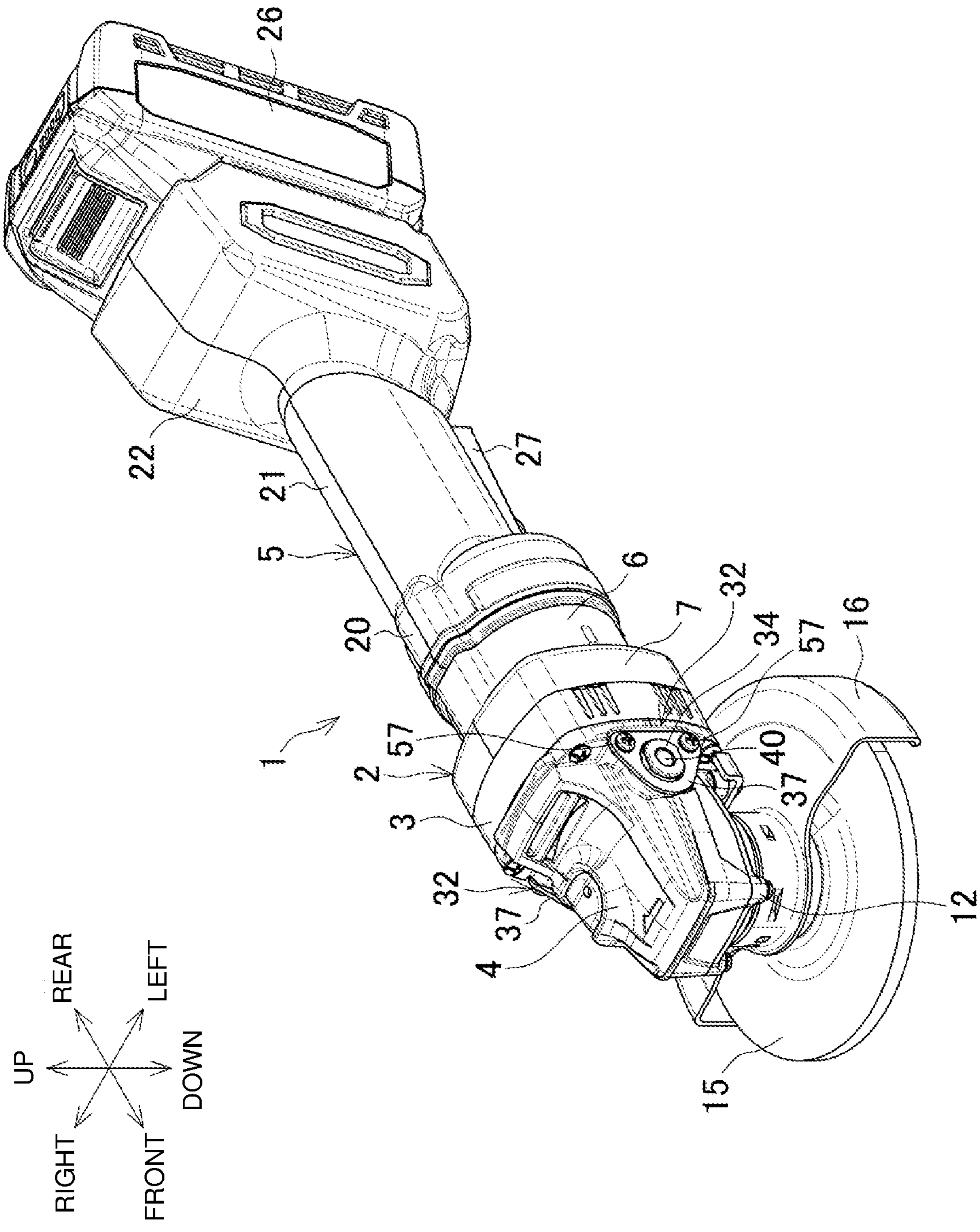
FIG. 1 is a perspective view of a grinder according to a first embodiment.
Figure 2:
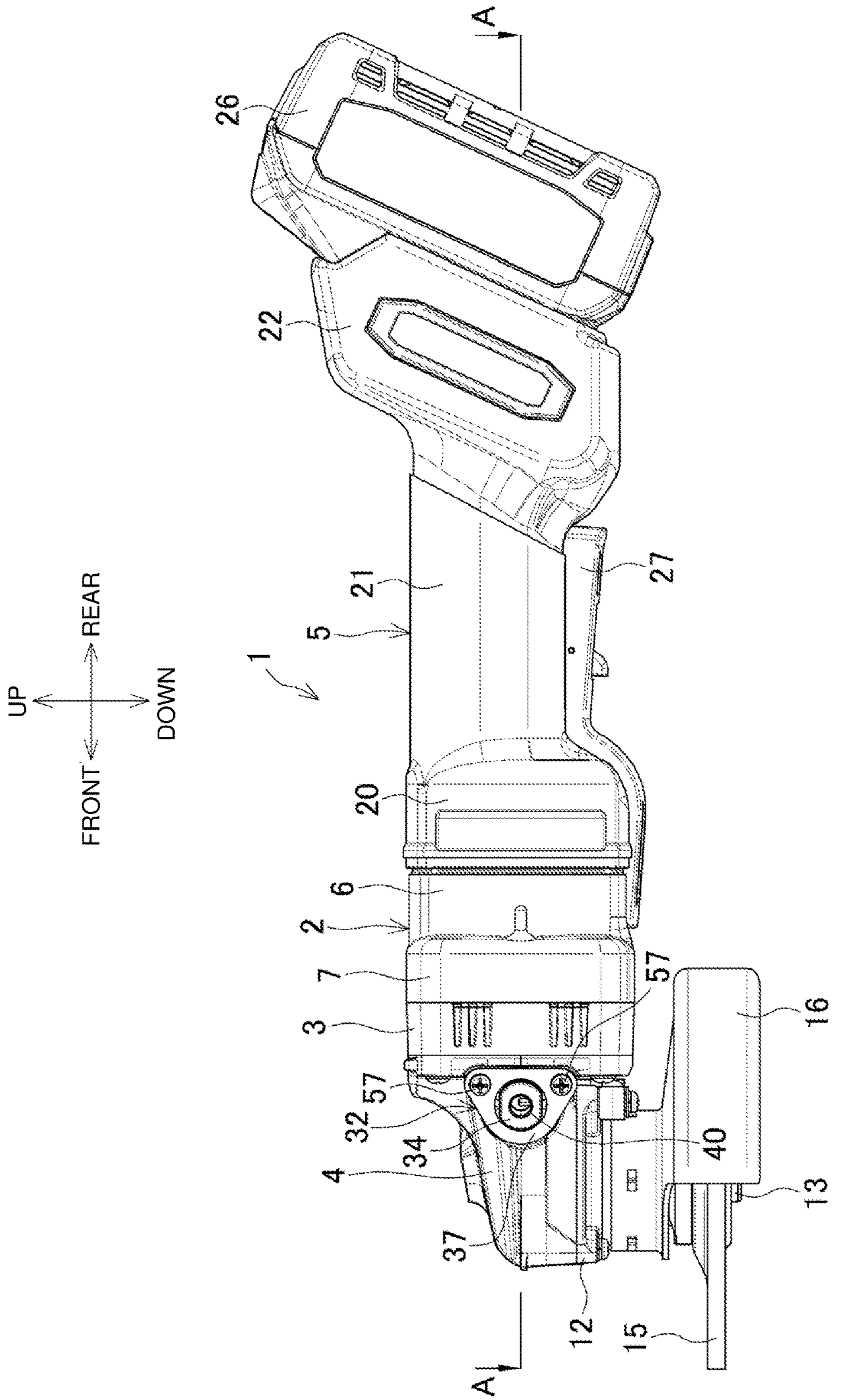
FIG. 2 is a side view of the grinder according to the first embodiment.
Figure 3:
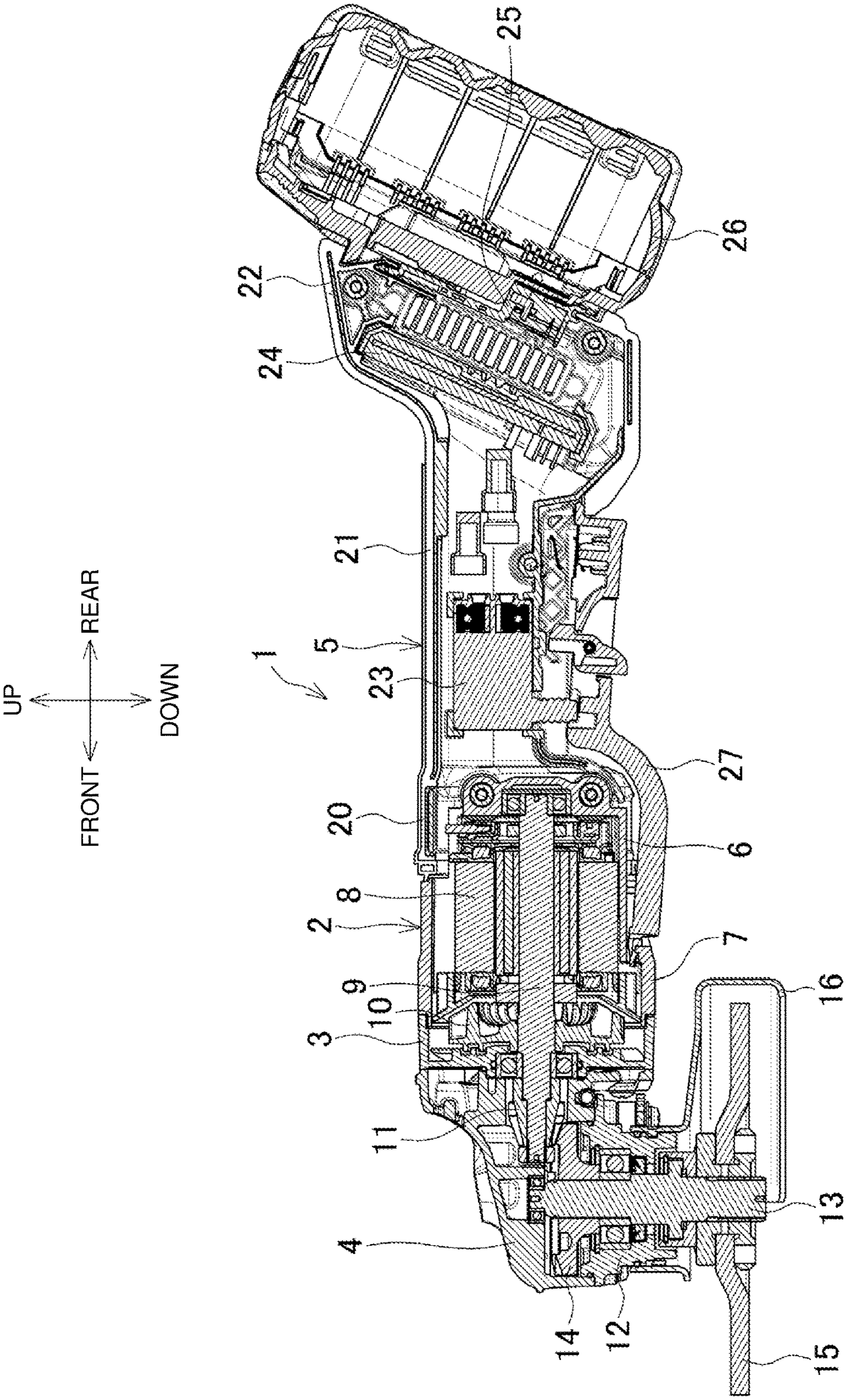
FIG. 3 is a longitudinal central sectional view of the grinder according to the first embodiment.

FIG. 1 is a perspective view of a grinder as an example of a power tool. FIG. 2 is a side view of the grinder. FIG. 3 is a longitudinal central sectional view of the grinder.

A grinder 1 includes a motor housing 2 extending in the front-rear direction. A middle housing 3 that is rectangular as viewed from the front is joined to the front of the motor housing 2. A gear housing 4 is joined to the front of the middle housing 3. A grip housing 5 is joined to the rear of the motor housing 2 and extends in the front-rear direction.

The motor housing 2 includes a cylindrical rear housing 6 and a front housing 7 that is rectangular as viewed from the front. The rear housing 6 accommodates a motor 8. The front housing 7 is connected to the gear housing 4, with the middle housing 3 in between, with screws that are screwed in from the front of the gear housing 4.

The motor 8 includes a rotational shaft 9 extending in the front-rear direction. The rotational shaft 9 includes its front portion protruding into the gear housing 4 through the front housing 7 and the middle housing 3. A fan 10 is fixed to the rotational shaft 9 in the middle housing 3. A first bevel gear 11 is fixed to the front end of the rotational shaft 9 in the gear housing 4.

A bearing box 12 is fastened to a lower portion of the gear housing 4 from below with screws. A spindle 13 is axially supported and extends in the vertical direction inside the gear housing 4 and the bearing box 12. A second bevel gear 14 is fixed to the spindle 13. The second bevel gear 14 meshes with the first bevel gear 11.

The spindle 13 has its lower end protruding downward from the bearing box 12. A disk-shaped tip tool (e.g., a grinding wheel) 15 is attached to the lower end of the spindle 13 in a direction orthogonal to the spindle 13. A wheel cover 16 is mounted on a lower portion of the bearing box 12. The wheel cover 16 is semicircular as viewed in plan and covers the rear of the tip tool 15 from above and behind.

The grip housing 5 includes a front grip 20, a middle grip 21, and a rear grip 22. The front grip 20 flares frontward and is joined to an outer portion of the rear housing 6 in the motor housing 2. The middle grip 21 has a smaller diameter than the front grip 20. The middle grip 21 accommodates a switch 23. The rear grip 22 flares rearward. The rear grip 22 accommodates a controller 24 and a terminal mount 25. A battery pack 26 that serves as a power supply is attached to the rear grip 22.

A switch lever 27 is located in lower portions of the motor housing 2 and the grip housing 5. The switch lever 27 has a front end connected to the lower surface of the rear housing 6 in a rotatable manner. The switch lever 27 extends rearward to the lower surface of the middle grip 21. The switch lever 27 is pushed upward to turn on the switch 23.

Figure 4:
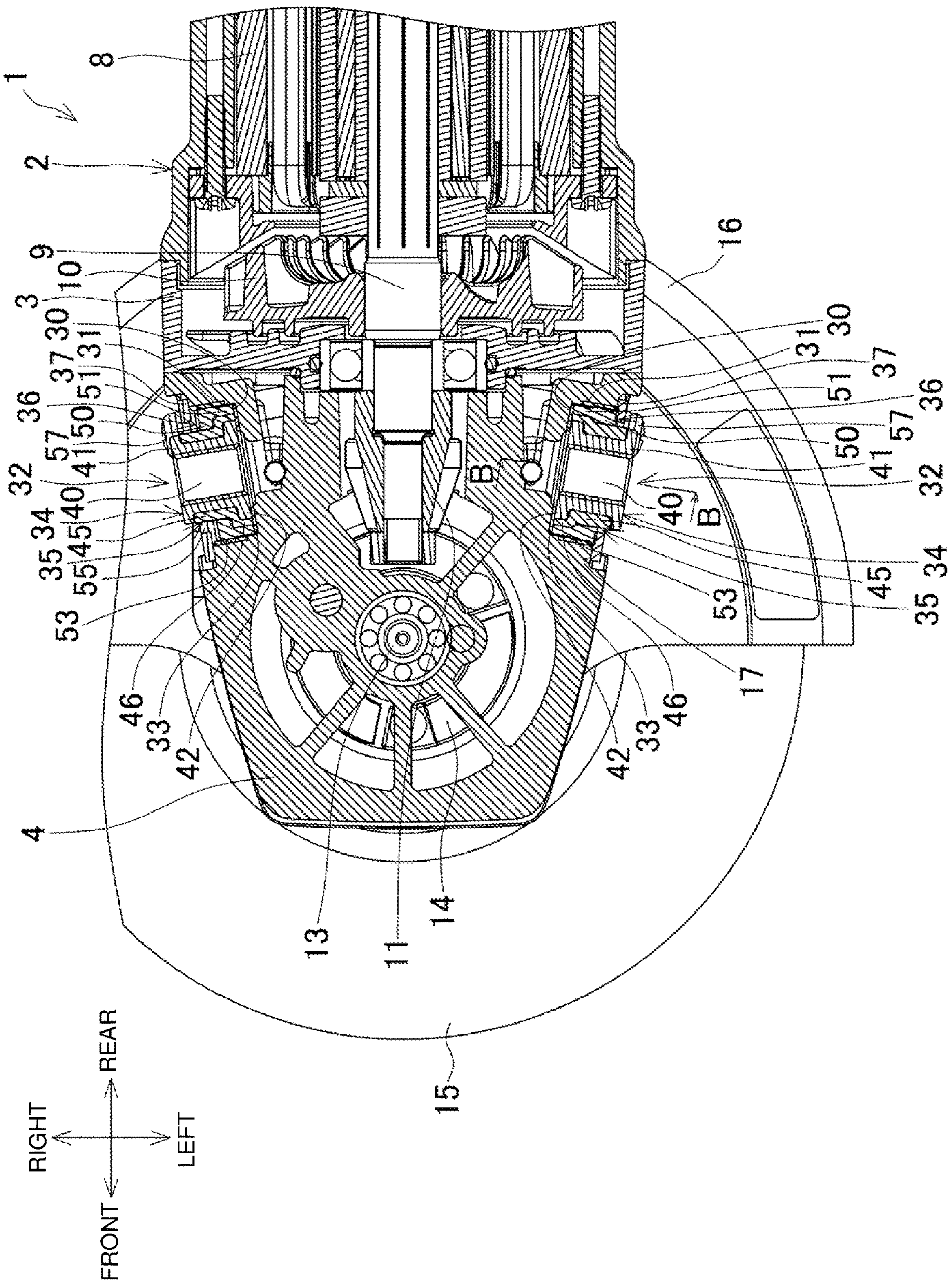
FIG. 4 is a partially enlarged sectional view taken along line A-A in FIG. 2.
Figure 5:
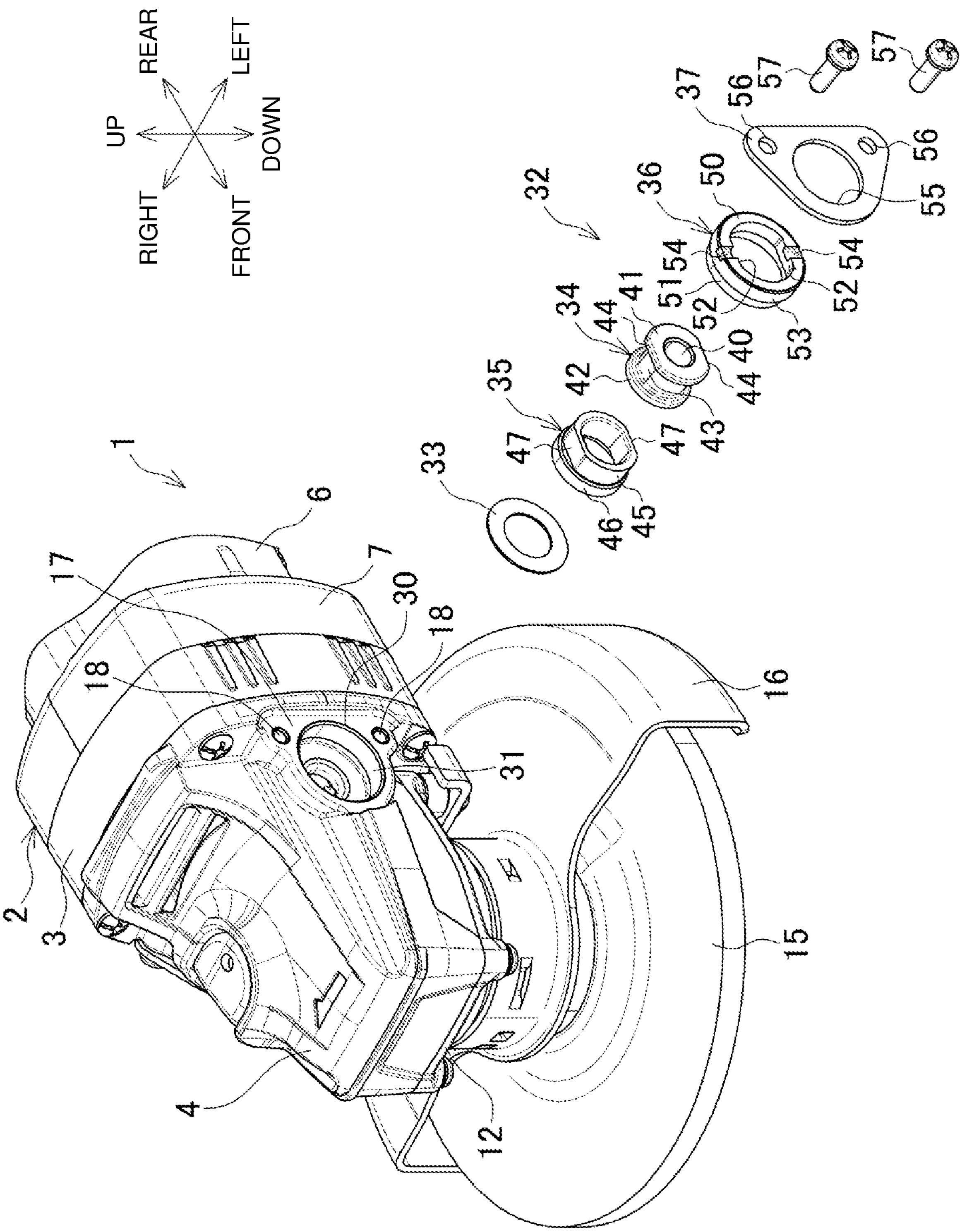
FIG. 5 is an exploded perspective view of a support assembly.

As shown in FIGS. 4 and 5, the gear housing 4 has, on its left and right side surfaces, mount holes 30 that are blind holes and symmetrical to each other. Each mount hole 30 is open outward to the left or to the right, and slightly to the front. Each mount hole 30 has an internal thread 31 on its inner circumference. Each mount hole 30 accommodates a support assembly 32, to which a side handle 60 (described later) is to be attached. The support assemblies 32 are symmetrical to each other. The left support assembly 32 will be described below.

The support assembly 32 includes a washer 33, a nut 34, an elastic member 35, a mount ring 36, and a cover plate 37. These components except the elastic member 35 are formed from metal. The elastic member 35 is formed from an elastic material such as rubber.

The washer 33 is accommodated on a bottom of the mount hole 30.

The nut 34 is accommodated in the mount hole 30 on the left of the washer 33. The nut 34 is cylindrical and has an internal thread 40 on its inner circumference. The nut 34 includes an outer flange 41 and an inner flange 42. The nut 34 has, on its outer circumferential surface, a pair of nut flat edges 43 that are parallel to each other. The outer flange 41 is coaxially located at the left end of the nut 34. The outer flange 41 has, on its outer circumferential surface, a pair of flange flat edges 44 that are parallel to the pair of nut flat edges 43. The inner flange 42 has substantially the same outer diameter as the outer flange 41 and is coaxially located at the right end of the nut 34.

The elastic member 35 is cylindrical and has a two-step diameter, or includes a smaller-diameter portion 45 and a larger-diameter portion 46 that are coaxial with each other. The larger-diameter portion 46 has a larger diameter than the smaller-diameter portion 45. The smaller-diameter portion 45 is externally mounted on the nut 34 rightward from the outer flange 41. The smaller-diameter portion 45 has a larger outer diameter than the outer flange 41 on the nut 34. The smaller-diameter portion 45 has a pair of elastic member flat edges 47 that are fitted to the pair of nut flat edges 43 of the nut 34.

The larger-diameter portion 46 is integral with the right end of the smaller-diameter portion 45. The larger-diameter portion 46 covers the inner flange 42 from the left, except the right end face of the inner flange 42.

To be integral with the nut 34, the elastic member 35 may be insert-molded with the nut 34 or may be prepared separately and then mounted externally on the nut 34.

The mount ring 36 includes an outer ring 50 and an inner ring 51. The mount ring 36 is shorter than the elastic member 35 in an axial direction. The outer ring 50 has an inner diameter larger than the outer diameter of each of the outer flange 41 and the inner flange 42 on the nut 34. The outer ring 50 has, on its inner circumference, a pair of ring flat edges 52 that are parallel to the pair of flange flat edges 44 of the outer flange 41. The outer ring 50 includes, on its outer circumference, a threaded portion 53 that is screwed onto the internal thread 31 on the mount hole 30. The outer ring 50 has, on its left end face, grooves 54 extending in the diameter direction. The grooves 54 receive, for example, a tool for rotating the mount ring 36.

The inner ring 51 has a larger inner diameter than the outer ring 50. The inner ring 51 has a smaller outer diameter than the outer ring 50.

The cover plate 37 has a circular hole 55 at its center. The circular hole 55 has a smaller diameter than the outer ring 50 on the mount ring 36, and has a larger diameter than the outer flange 41 on the nut 34. The cover plate 37 has a pair of small holes 56 above and below the circular hole 55. The gear housing 4 has, on its left side surface, a receiving surface 17 that is flat and receives the cover plate 37. The receiving surface 17 has a pair of threaded holes 18 aligned with the pair of small holes 56.

The support assembly 32 is assembled as described below.

Figure 6:
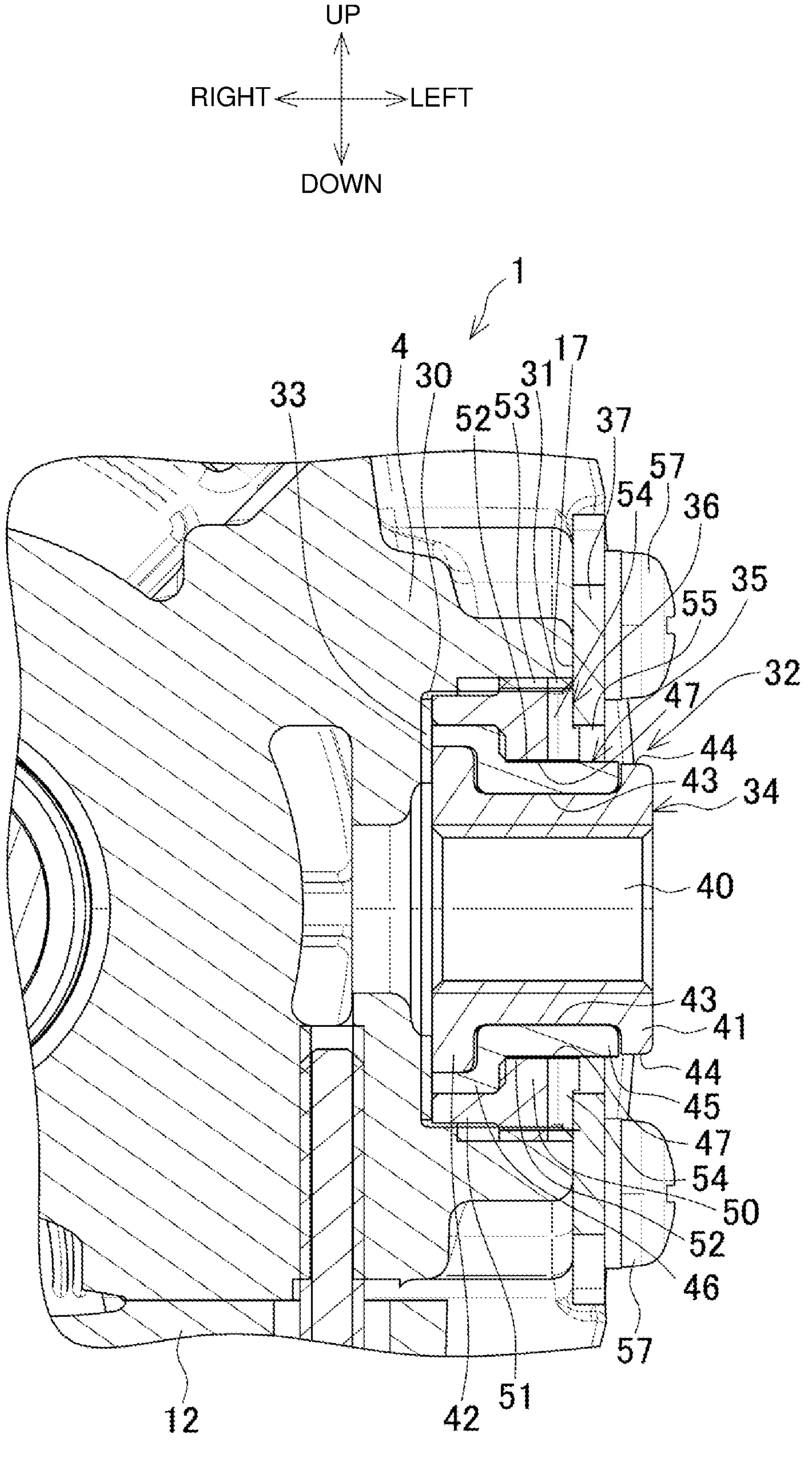
FIG. 6 is a partially enlarged sectional view taken along line B-B in FIG. 4.

The mount ring 36 is first fitted into the mount hole 30 from outside, with the mount hole 30 accommodating the washer 33 and the nut 34 on which the elastic member 35 is integrally and externally mounted. In this state, the ring flat edges 52 of the outer ring 50 are aligned with the flange flat edges 44 of the outer flange 41. The threaded portion 53 is screwed onto the internal thread 31. The mount ring 36 is then screwed. While the nut 34 and the elastic member 35 are being rotated integrally, the mount ring 36 is screwed deep into the mount hole 30. When the inner ring 51 comes in contact with the washer 33, the screwing operation ends. In this state, as shown in FIG. 6, the ring flat edges 52 of the outer ring 50 overlap the inner flange 42 on the nut 34 as viewed in the axial direction. The nut 34 is pressed against the washer 33 with the elastic member 35 in between, and thus is prevented from slipping off. The nut 34 is elastically held by the elastic member 35 in the mount hole 30 along its entire circumference.

Finally, with the nut 34 in the circular hole 55, the cover plate 37 is placed on the receiving surface 17, and a screw 57 is screwed into the threaded hole 18 through each of the pair of small holes 56. The mount ring 36 is covered from outside with the cover plate 37 and is restricted from rotating (being loosened) unexpectedly. Any loosened mount ring 36 is less likely to drop from the gear housing 4.

Figure 7:
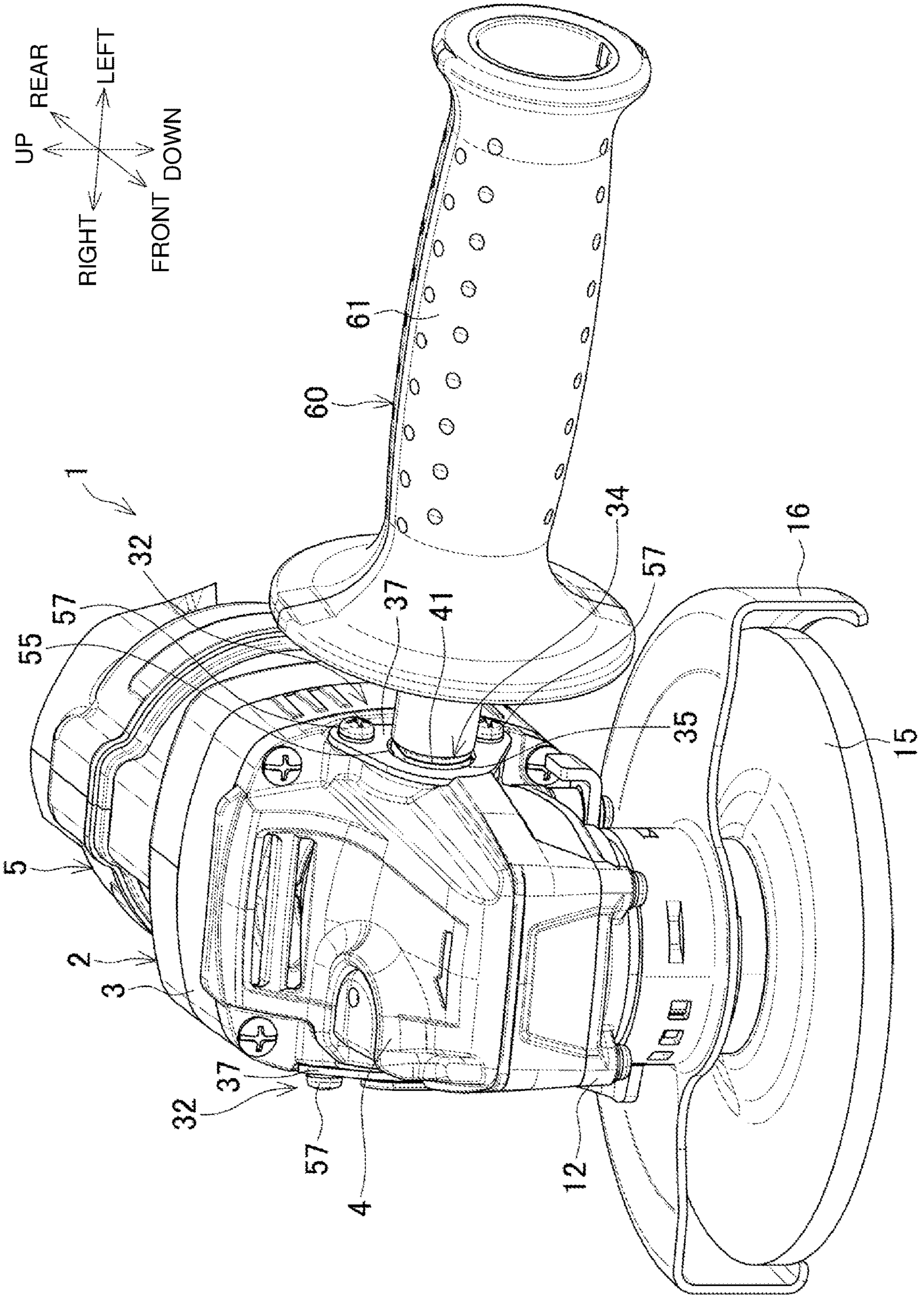
FIG. 7 is a partial perspective view of the grinder according to the first embodiment to which a side handle is attached.
Figure 8:
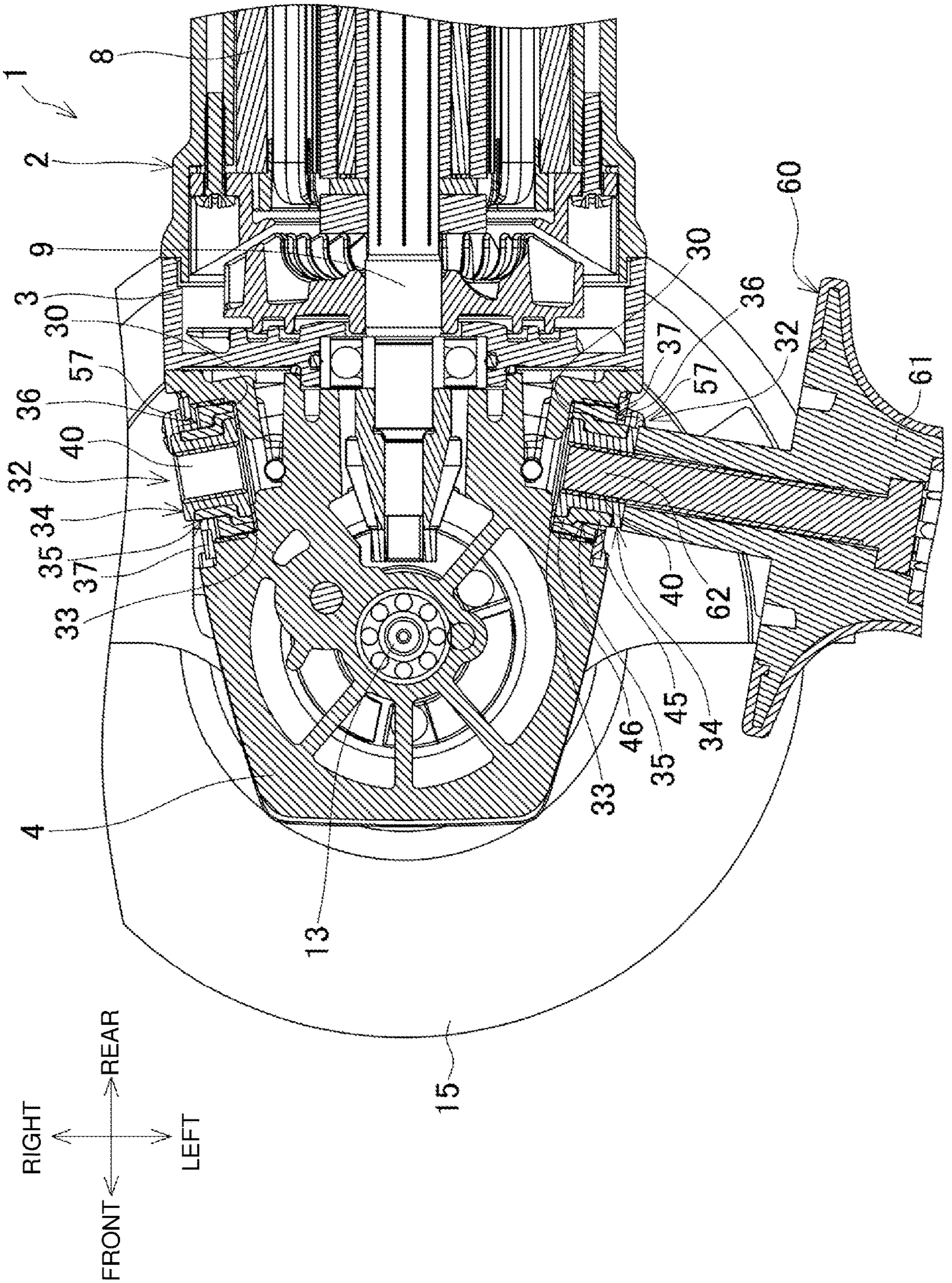
FIG. 8 is an enlarged sectional view of a front portion of the grinder according to the first embodiment to which the side handle is attached taken along line A-A in FIG. 2.

The side handle 60 to be attached to the support assembly 32 includes a grip 61 formed from resin and a screw shaft 62 as shown in FIGS. 7 and 8. The screw shaft 62 is held by the grip 61 and protrudes from the grip 61.

To use the side handle 60, the screw shaft 62 is screwed into the nut 34 in the left or right support assembly 32 (left in the present embodiment). The side handle 60 is thus coupled to the gear housing 4 with the nut 34. When the screw shaft 62 is screwed, the pair of flange flat edges 44 of the outer flange 41 fitted to the pair of ring flat edges 52 of the mount ring 36 restrict the nut 34 from rotating. The screw shaft 62 can thus be screwed into the nut 34 without being obstructed by the elastic member 35 on the nut 34. The same applies to the removing operation.

With the grinder 1 according to the present embodiment, the switch lever 27 is pressed with a hand gripping the middle grip 21 to turn on the switch 23. The controller 24 then drives the motor 8. The rotation of the rotational shaft 9 is transmitted to the spindle 13 through the first and second bevel gears 11 and 14. The tip tool 15 rotates integrally with the spindle 13 to, for example, grind a workpiece.

During operation, the tip tool 15 and the motor 8 may cause vibration. In the present embodiment, the elastic member 35 is located between the gear housing 4 and the nut 34 to which the side handle 60 is coupled. This reduces vibration transmitted to the side handle 60. This reduces discomfort felt by the operator gripping the grip 61 with a hand.

With the grinder 1 according to the first embodiment, the side handle 60 (auxiliary handle) is screwed into the nut 34 on one side surface of the gear housing 4 (housing) for attachment to the gear housing 4 (housing).

The nut 34 is held on the gear housing 4 with the elastic member 35 in between.

With the nut 34 elastically held on the gear housing 4, the grinder 1 with this structure can isolate vibration. Thus, with the side handle 60 having no structure for isolating vibration, the grinder 1 effectively isolates vibration and maintains high operability.

The elastic member 35 is located along the entire circumference of the nut 34.

This structure effectively and evenly isolates vibration in the circumferential direction of the nut 34.

The mount ring 36 (mount) is used for mounting the nut 34 and the elastic member 35 on the gear housing 4.

The nut 34 and the elastic member 35 are thus stably held on the gear housing 4.

The mount ring 36 is screwed into the gear housing 4 to be mounted on the gear housing 4.

The mount ring 36 can thus be easily attached to or removed from the gear housing 4 for easy replacement of the nut 34 and the elastic member 35.

The nut 34 is held by the mount ring 36 in a nonrotatable manner.

The elastically supported nut 34 is easily held by the mount ring 36 in a nonrotatable manner.

The cover plate 37 (drop stopper) is mounted on the gear housing 4 to prevent the mount ring 36 from dropping.

For the mount ring 36 being screwed, this structure can prevent the mount ring 36 from dropping or being loosened.

The housing includes, in its front portion, the gear housing 4 with the spindle 13 protruding downward. The spindle 13 has its lower end to which the tip tool 15 is attachable. The nut 34 is located on each of the side surfaces of the gear housing 4.

This structure effectively isolates vibration transmitted from the front portion of the grinder 1 to the side handle 60.

In the first embodiment, the nut and the elastic member may be formed in other manners.

For example, the nut may not include the outer flange. In this case, the nut flat edges of the nut may be fitted to the ring flat edges of the mount ring.

The nut and the elastic member may be integral in the rotation direction with a method other than using the width across flats with their flat edges. For example, the nut and the elastic member may be integral in the rotation direction using their polygonal cross sections, such as rectangular or hexagonal cross sections.

The elastic member may not be cylindrical. The elastic member may have a C-shaped cross section and include a portion split by a slit in the circumferential direction. In some embodiments, multiple elastic members may surround the nut. In this case, each of the elastic members may have a ball shape or a needle shape.

The mount ring may have any shape that fits to the nut, other than the width across flats. Similarly to the nut and the elastic member integral with each other, the mount ring and the nut may be fitted to each other using their polygonal cross sections, such as rectangular or hexagonal cross sections. The mount ring may have holes in the end faces, instead of the grooves. The mount ring may be attached in manners other than being screwed into the gear housing, including engagement between a recess and a protrusion. The mount ring may be eliminated.

The drop stopper may be a component other than the cover plate. Multiple drop stoppers may be fastened to the gear housing with screws to hold the mount ring from outside.

The drop stopper may be eliminated.

Second Embodiment

A second embodiment will now be described. A grinder according to the second embodiment has the same structure as in the first embodiment except its support assembly, and will be described focusing on the support assembly. The same components as in the first embodiment will not be described repeatedly.

Figure 9:
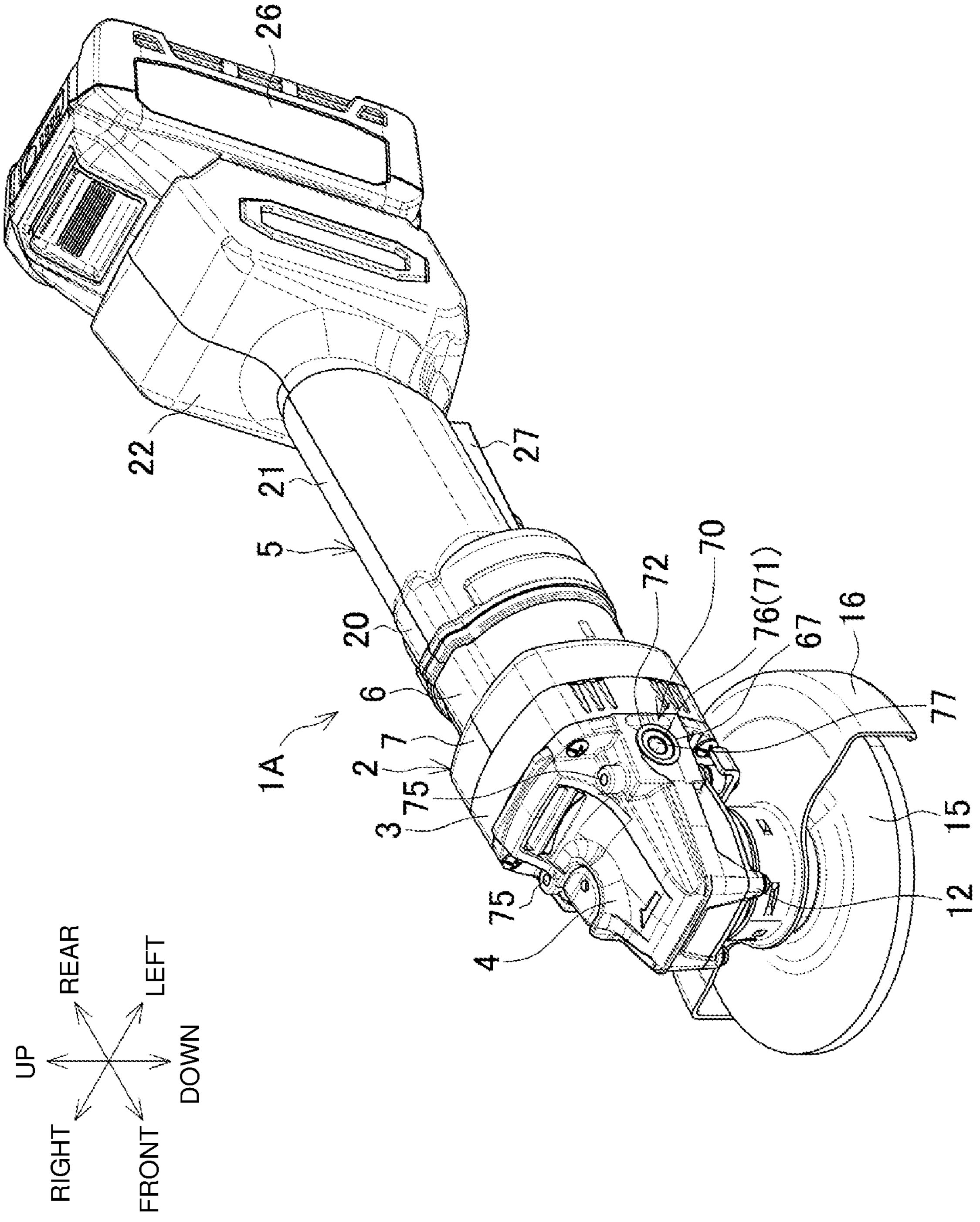
FIG. 9 is a perspective view of a grinder according to a second embodiment.
Figure 10:
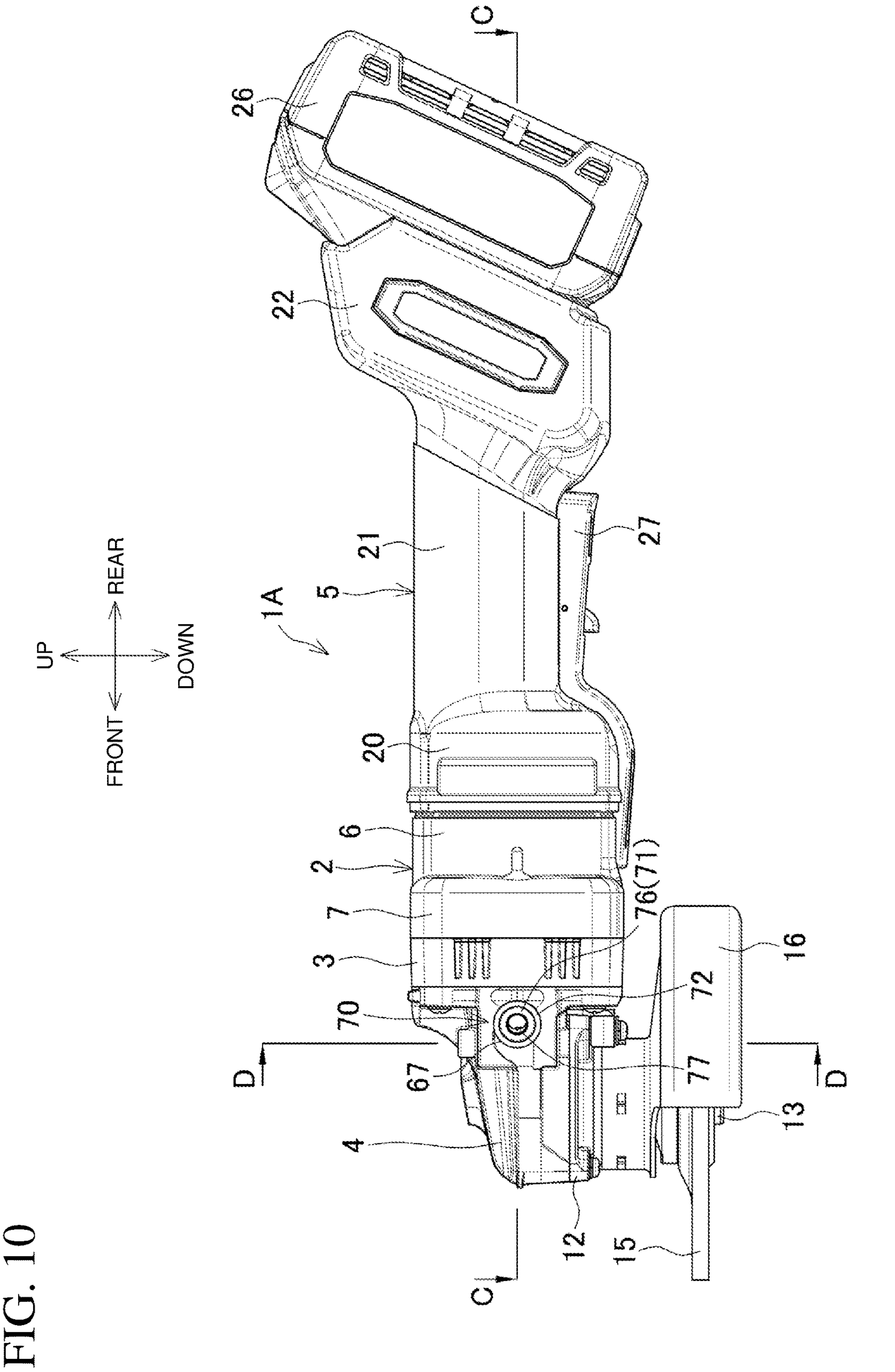
FIG. 10 is a side view of the grinder according to the second embodiment.
Figure 11:
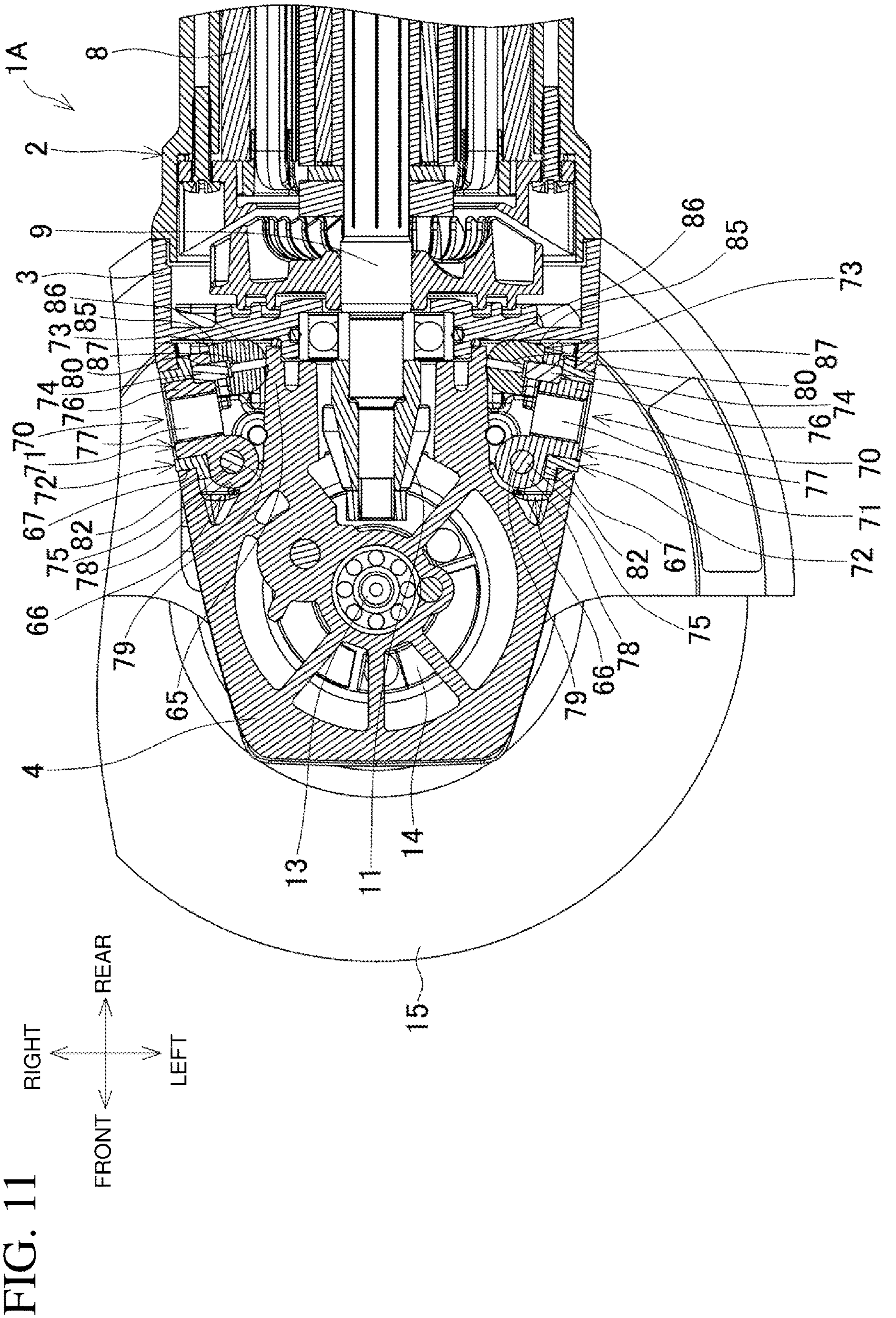
FIG. 11 is a partially enlarged sectional view taken along line C-C in FIG. 10.

FIG. 9 is a perspective view of a grinder. FIG. 10 is a side view of the grinder. FIG. 11 is a partially enlarged sectional view taken along line C-C in FIG. 10.

A grinder 1A includes, in the gear housing 4, a cylindrical portion 65 from which the rotational shaft 9 protrudes. The cylindrical portion 65 includes, on each of its left and right side surfaces, a compartment 66 having a circular opening 67. Each compartment 66 accommodates a support assembly 70. The support assemblies 70 are symmetrical to each other. The left support assembly 70 will be described below.

Figure 12:
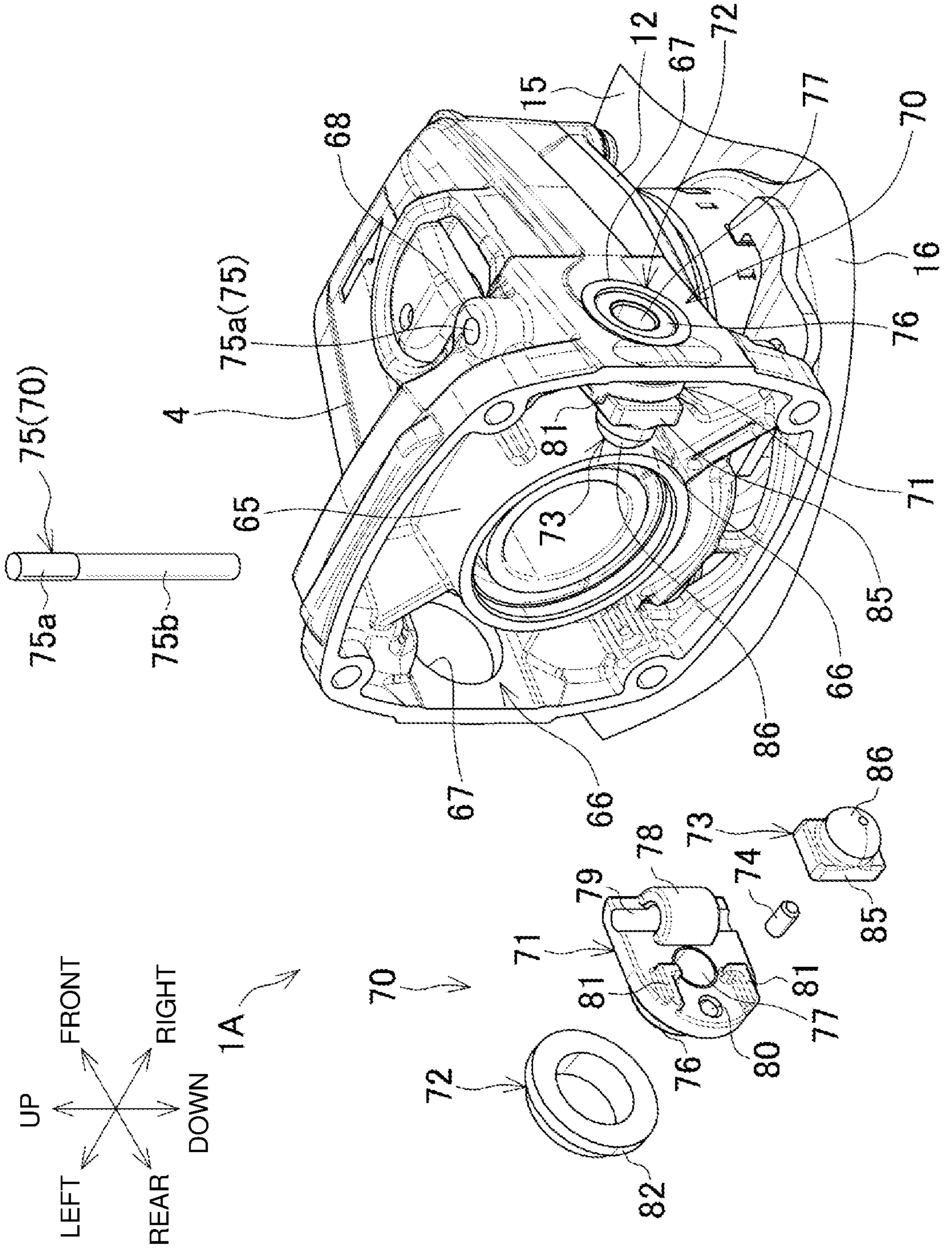
FIG. 12 is an exploded perspective view of a support assembly as viewed from the right.
Figure 13:
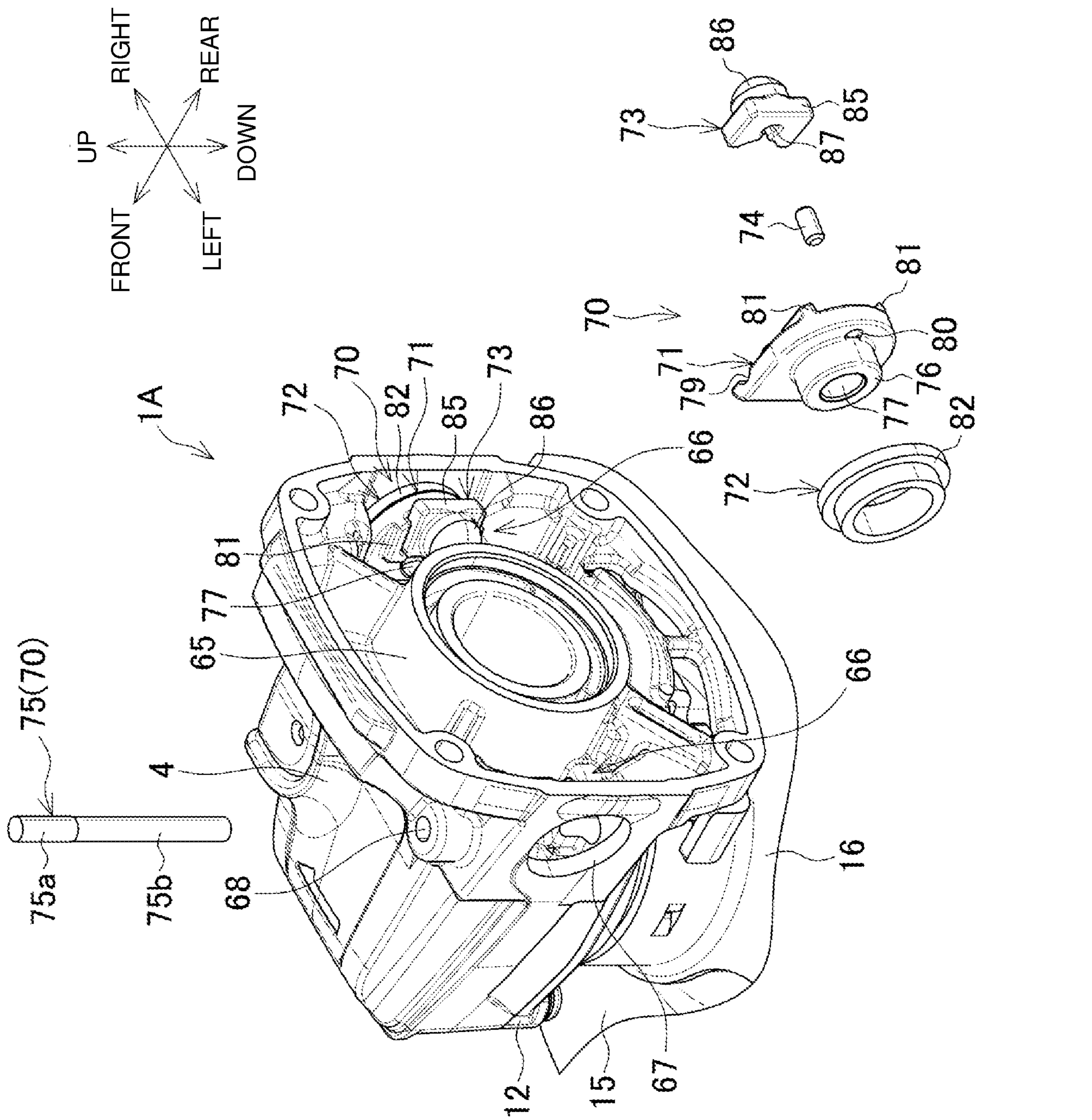
FIG. 13 is an exploded perspective view of the support assembly as viewed from the left.

The support assembly 70 includes a nut 71, a first elastic member 72, a second elastic member 73, a coupling pin 74, and a pivot pin 75, as shown in FIGS. 12 and 13.

The nut 71 is a plate extending in the front-rear direction. The nut 71 includes a nut portion 76 protruding orthogonally to the nut 71 from its rear portion. The nut portion 76 is cylindrical and protrudes from the left surface of the nut 71. The nut portion 76 includes an internal thread 77 on its inner circumference. A boss 78 is located on a front portion and on the right surface of the nut 71. The boss 78 has, at its center, a support hole 79 extending through the boss 78 in the vertical direction.

The nut 71 has a through-hole 80 extending orthogonally to the nut 71. The through-hole 80 is adjacent to the rear of the nut portion 76. The through-hole 80 has a smaller diameter than the internal thread 77. A pair of support ribs 81 are located on the right surface of the nut 71 above and below the through-hole 80. Each support rib 81 protrudes to the right.

The first elastic member 72 is on the left of the nut 71. The first elastic member 72 is a short cylinder externally mounted on the nut portion 76. The first elastic member 72 is formed from an elastic material such as rubber. The first elastic member 72 is longer in the axial direction than the protruding nut portion 76. The first elastic member 72 has a smaller outer diameter than the opening 67 of the compartment 66. A flange 82 surrounds the right end of the first elastic member 72. When externally mounted on the nut portion 76, the flange 82 is in contact with the left surface of the nut 71. The flange 82 has a larger outer diameter than the opening 67.

The second elastic member 73 is on the right of the nut 71. The second elastic member 73 includes a plate 85 and a sphere 86. The sphere 86 protrudes rightward from the plate 85. The second elastic member 73 is formed from an elastic material such as rubber. The plate 85 is rectangular and fitted between the support ribs 81 on the nut 71. The plate 85 has a blind hole 87 on its left surface.

The coupling pin 74 has its left end placed into the through-hole 80 in the nut 71. In this state, the plate 85 in the second elastic member 73 is fitted between the support ribs 81. The right end of the coupling pin 74 is then placed into the blind hole 87. The second elastic member 73 is thus connected to the nut 71 with the coupling pin 74 that extends across the through-hole 80 and the blind hole 87. In this state, the sphere 86 protrudes rightward from the nut 71.

Figure 14:
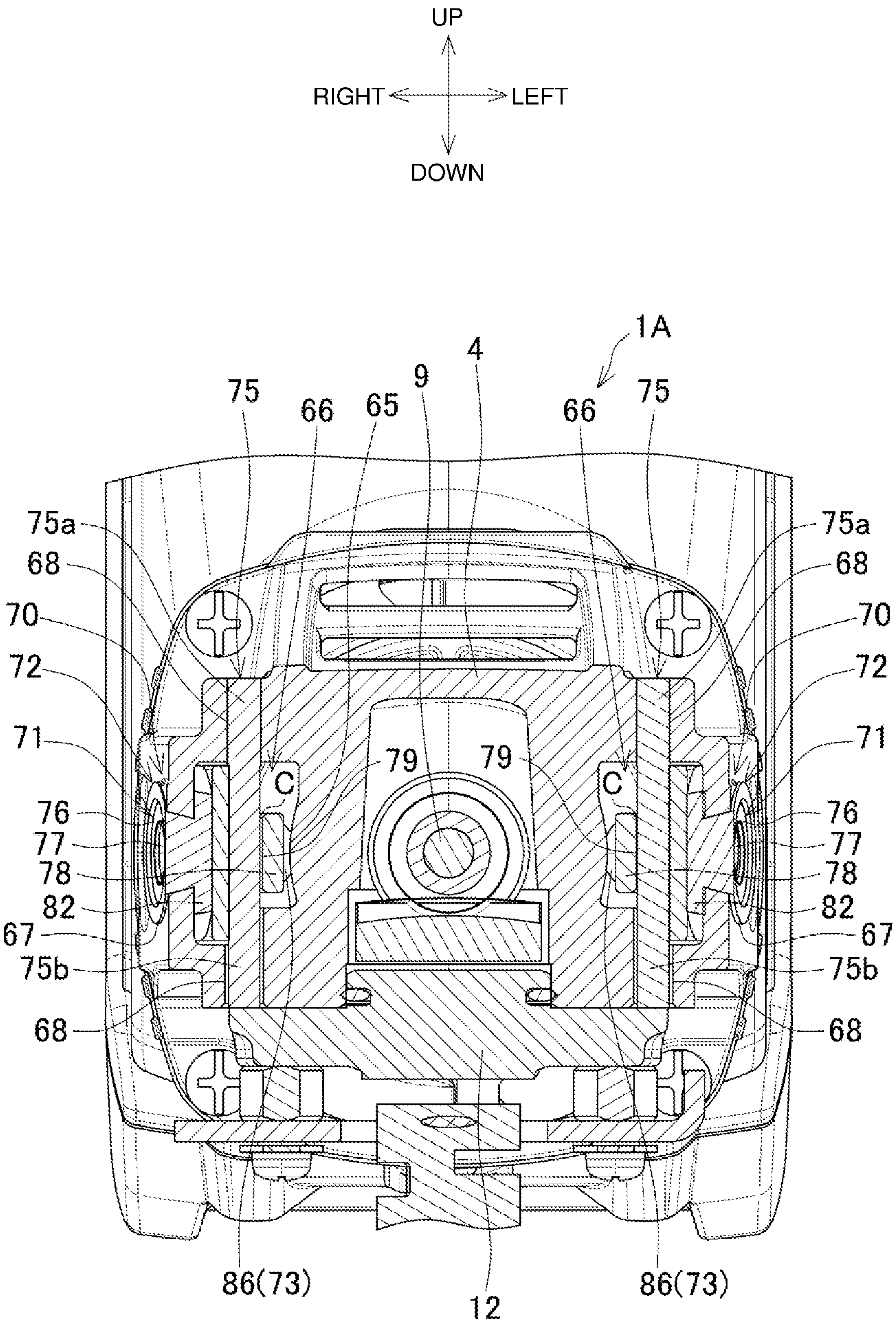
FIG. 14 is a partially enlarged sectional view taken along line D-D in FIG. 10.

As shown in FIG. 14, the gear housing 4 has insertion holes 68 above and below front portions of the compartments 66. The pivot pin 75 is placed into each insertion hole 68 from above to extend through the compartment 66.

The pivot pin 75 includes an upper portion 75*a* press-fitted into the upper insertion hole 68. The pivot pin 75 extending through the compartment 66 includes a lower portion 75*b* with a smaller diameter than the upper portion 75*a* and a smaller diameter than the support hole 79 in the nut 71.

The support assembly 70 is assembled as described below.

The first elastic member 72 is mounted on the left surface of the nut 71. The second elastic member 73 is mounted on the right surface of the nut 71 with the coupling pin 74. The nut 71 with the boss 78 at the front is accommodated in the compartment 66. With the support hole 79 aligned with the upper and lower insertion holes 68, the pivot pin 75 is placed from above the gear housing 4 across the support hole 79 and the insertion holes 68. As shown in FIG. 14, the nut 71 is supported to be laterally swingable about the pivot pin 75 in the compartment 66. The pivot pin 75 has its lower end in contact with the upper surface of the bearing box 12, and thus is prevented from slipping out downward.

In this state, the first elastic member 72 is at the center of the opening 67 in the compartment 66, causing the flange 82 to be in contact with the inner surface of the gear housing 4. At the same time, the second elastic member 73 causes the sphere 86 to be in contact with the outer surface of the cylindrical portion 65 in the gear housing 4. The nut 71 is elastically supported by the first elastic member 72 and the second elastic member 73 in the compartment 66.

The lower portion 75*b* of the pivot pin 75 has a smaller diameter than the support hole 79 in the nut 71. This structure leaves a clearance C between the lower portion 75*b* and the support hole 79. The nut 71 can be mounted easily using the pivot pin 75. Further, vibration is less likely to be transmitted from the gear housing 4 to the nut 71 through the pivot pin 75. With the clearance C, the first elastic member 72 and the second elastic member 73 reduce rattling of the nut 71.

Figure 15:
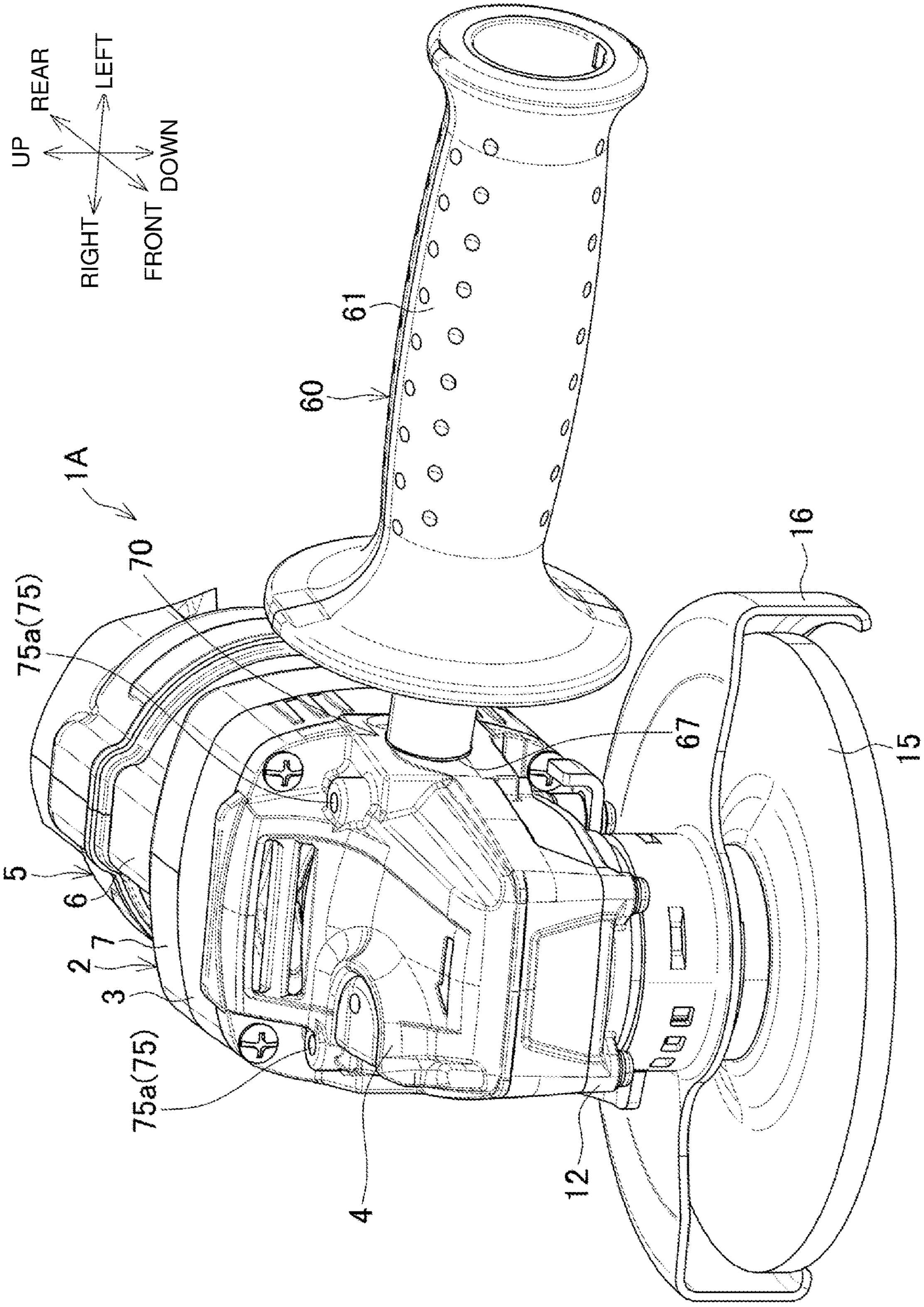
FIG. 15 is a partial perspective view of the grinder according to the second embodiment to which the side handle is attached.
Figure 16:
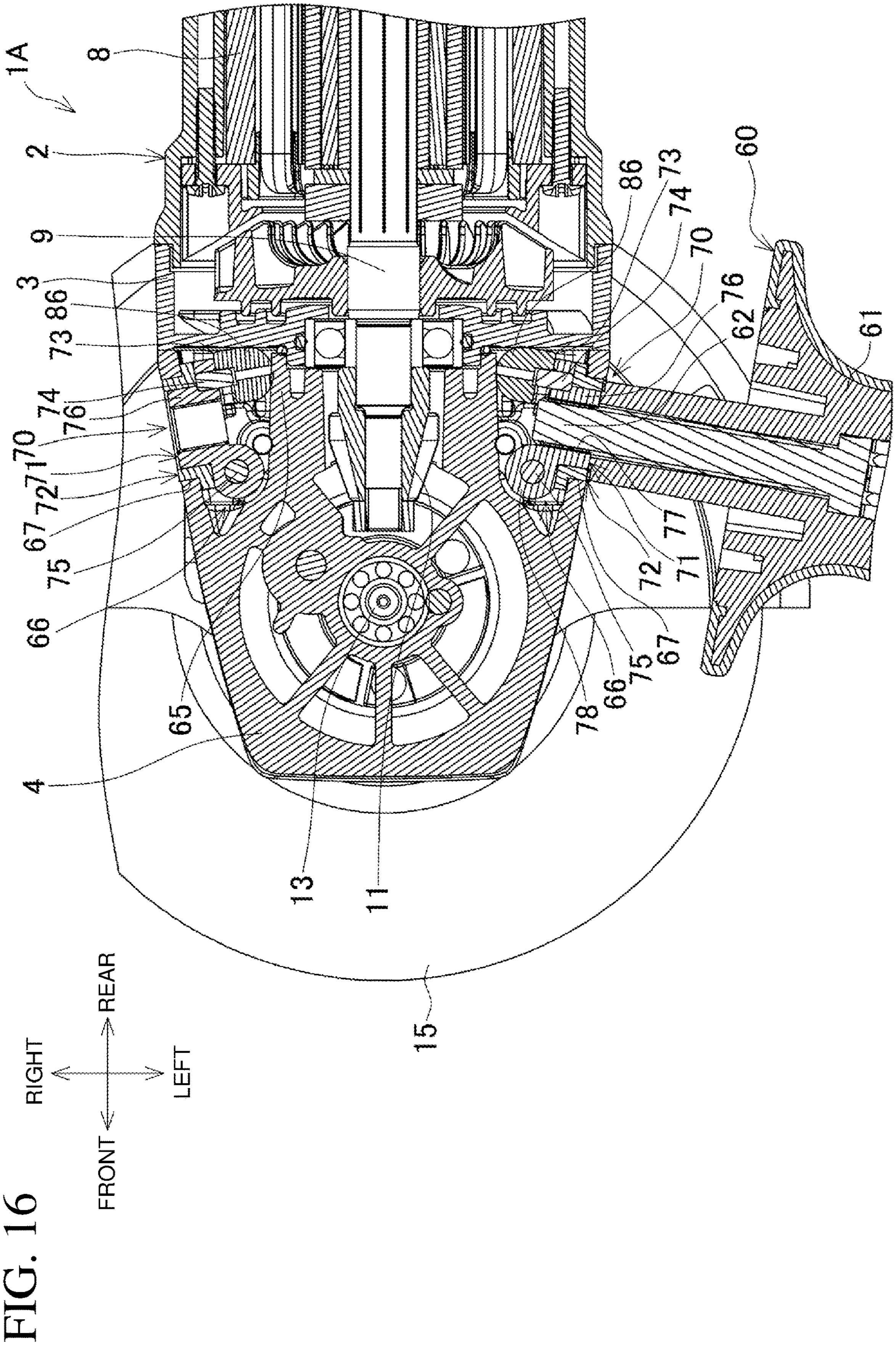
FIG. 16 is an enlarged sectional view of a front portion of the grinder according to the second embodiment to which the side handle is attached taken along line C-C in FIG. 10.

To use the side handle 60, the screw shaft 62 is screwed into the nut portion 76 in the right or left support assembly 70 (left in the present embodiment). As shown in FIGS. 15 and 16, the side handle 60 is coupled to the gear housing 4 with the nut 71.

With the grinder 1A according to the present embodiment, the switch lever 27 is pressed with a hand gripping the middle grip 21 to turn on the switch. The controller 24 then drives the motor 8. The rotation of the rotational shaft 9 is transmitted to the spindle 13 through the first and second bevel gears 11 and 14, thus rotating the tip tool 15. The rotating tip tool 15 can, for example, grind a workpiece.

During operation, the tip tool 15 and the motor 8 may cause vibration. In the present embodiment, the first elastic member 72 and the second elastic member 73 are located between the gear housing 4 and the nut 71 to which the side handle 60 is coupled. This reduces vibration transmitted to the side handle 60. This reduces discomfort felt by the operator gripping the grip 61 with a hand.

With the grinder 1A according to the second embodiment, the side handle 60 is screwed into the nut 71 on one side surface of the gear housing 4 for attachment to the gear housing 4.

The nut 71 is held on the gear housing 4 with the first elastic member 72 (elastic member) in between.

With the nut 71 elastically held on the gear housing 4, the grinder 1A with this structure can isolate vibration. Thus, with the side handle 60 having no structure for isolating vibration, the grinder 1A effectively isolates vibration and maintains high operability.

The first elastic member 72 is located along the entire circumference of the nut portion 76 of the nut 71.

This structure effectively and evenly isolates vibration in the circumferential direction of the nut portion 76.

The nut 71 is coupled to be rotatable about the pivot pin 75 (pivot) in the gear housing 4. The first elastic member 72 is located between the nut 71 and the gear housing 4.

While rotating about the pivot pin 75, the nut 71 is elastically held easily.

The clearance C is between the nut 71 and the pivot pin 75.

Thus, with the nut 71 coupled with the pivot pin 75, vibration is less likely to be transmitted to the nut 71 through the pivot pin 75.

The second elastic member 73 is located opposite to the first elastic member 72 across the nut 71 in the rotation direction of the nut 71.

The nut 71 rotating about the pivot pin 75 is elastically held in either rotation direction.

The housing includes, in its front portion, the gear housing 4 with the spindle 13 protruding downward. The spindle 13 has its lower end to which the tip tool 15 is attachable. The nut 71 is located on each of the side surfaces of the gear housing 4.

This structure effectively isolates vibration transmitted from the front portion of the grinder 1A to the side handle 60.

In the second embodiment, the nut may have any other shape. For example, the nut may not be entirely a plate but may include a cylindrical portion through which the pivot pin extends and coupled to the cylindrical nut portion tangentially.

The pivot may have any structure other than the pivot pin. For example, the pivot pin may be integral with the nut and fitted into a recess on the gear housing. The gear housing may include a pin inside that may be fitted into a recess on the nut.

The pivot may not be located at the front of the nut as in the present embodiment. The pivot may be located at the rear of, above, or below the nut.

The first elastic member may not be cylindrical. The first elastic member may not be mounted on the nut but may be held on the inner surface of the gear housing. Similarly, the second elastic member may be held in the gear housing. The second elastic member may have another shape. The sphere may have any other shape. The second elastic member may be eliminated.

Modifications of the embodiments will be described below.

Instead of a direct current (DC) tool powered by a battery pack, the power tool may be an alternating current (AC) tool using utility power.

The power tool may be a device other than a grinder. The present disclosure is applicable to any tool that includes an auxiliary handle, for example, a grinding tool or a polishing tool (e.g., a polisher or a sander), or a cutting tool (e.g., a circular saw or a cutter). The power tool may not be an electric tool. The present disclosure is also applicable to an air tool or an engine tool.

The auxiliary handle may be attached to a component other than the gear housing. The side handle may be attached to the motor housing or another housing. The auxiliary handle may be oriented in a direction other than the lateral direction. The auxiliary handle may be any handle that is screwable into the nut, other than the side handle described above. For example, the grip may be looped.

REFERENCE SIGNS LIST

1, 1A grinder
2 motor housing
4 gear housing
5 grip housing
8 motor
9 rotational shaft
13 spindle
15 tip tool
17 receiving surface
30 mount hole
31, 40, 77 internal thread
32, 70 support assembly
33 washer
34, 71 nut
35 elastic member
36 mount ring
37 cover plate
41 outer flange
42 inner flange
53 threaded portion
57 screw
60 side handle
61 grip
62 screw shaft
66 compartment
67 opening
72 first elastic member
73 second elastic member
74 coupling pin
75 pivot pin
76 nut portion
85 plate
86 sphere

What is claimed is:

1. A power tool to which an auxiliary handle is attachable, the power tool comprising:
a housing having a mount hole located on a side surface of the housing;
a nut held in the mount hole to be screwed with the auxiliary handle;
an elastic member between the housing and the nut; and
a mount to be screwed with the mount hole to mount the nut and the elastic member in the mount hole,
wherein
the elastic member is externally mounted on the nut, and
the nut is held by the mount in a nonrotatable manner.

2. The power tool according to claim 1, further comprising:
a drop stopper mounted on the housing to prevent the mount from dropping.

3. The power tool according to claim 2, wherein
the housing includes, in a front portion, a gear housing with a spindle protruding downward, and the spindle has a lower end to which a tip tool is attachable, and
the nut is located on a side surface of the gear housing.

4. The power tool according to claim 1, wherein
the nut is coupled to be rotatable about a pivot in the housing.

5. The power tool according to claim 4, wherein
a clearance is between the nut and the pivot.

6. The power tool according to claim 5, further comprising:
a second elastic member located opposite to the elastic member across the nut in a rotation direction of the nut.

7. The power tool according to claim 4, wherein
the housing includes, in a front portion, a gear housing with a spindle protruding downward, and the spindle has a lower end to which a tip tool is attachable, and
the nut is located on a side surface of the gear housing.

8. The power tool according to claim 1, wherein
the housing includes, in a front portion, a gear housing with a spindle protruding downward, and the spindle has a lower end to which a tip tool is attachable, and
the nut is located on a side surface of the gear housing.

9. A power tool to which an auxiliary handle is attachable, the power tool comprising:
a housing;
a nut held on a side surface of the housing to be screwed with the auxiliary handle; and
an elastic member between the housing and the nut;
a second elastic member located opposite to the elastic member across the nut in a rotation direction of the nut,
wherein
the nut is coupled to be rotatable about a pivot in the housing, and
the elastic member is between the nut and the housing.

* * * * *